July 16, 1929.　　　　S. P. SHIPWAY　　　　1,720,762
STAND FOR THE DISPLAY OF COATS, COSTUMES, AND THE LIKE
Filed Nov. 26, 1926

Inventor
Stephen P. Shipway

Patented July 16, 1929.

1,720,762

UNITED STATES PATENT OFFICE.

STEPHEN PHILIP SHIPWAY, OF LONDON, ENGLAND, ASSIGNOR TO WHITBYS LIMITED, A COMPANY OF GREAT BRITAIN.

STAND FOR THE DISPLAY OF COATS, COSTUMES, AND THE LIKE.

Application filed November 26, 1926, Serial No. 150,963, and in Great Britain March 24, 1926.

This invention relates to an improved display stand for coats, mantles, costumes and the like.

The object of the invention is to provide a display stand which is capable of supporting a large number of garments, is of light and strong construction, and is capable of being taken to pieces for the purpose of facilitating storage and transport and so that the garment supporting parts of the stand may be interchangeable.

According to the invention therefore, a display stand is provided comprising a supporting part formed of a length of tubing bent into U-shape and furnished with suitable struts or legs, and a closed frame member, also formed of tubing and adapted to be detachably secured at the upper ends of the uprights of the U-shaped tubular supporting body.

The frame member may be of rectangular form, apertures being formed in its ends adapted to engage over screw threaded parts of reduced diameter at the ends of the arms of the U-shaped part and to be held thereon by means of knobs or equivalent devices screwed upon the threaded ends of the uprights above the frame.

The upper ends of the arms of the U-shaped member may be reduced in diameter, to form shoulders upon which the closed frame member can rest, and screw threaded to receive the retaining knobs. Alternatively screw threaded members may be attached to said ends to receive the frame and the fixing knobs.

Figure 1:
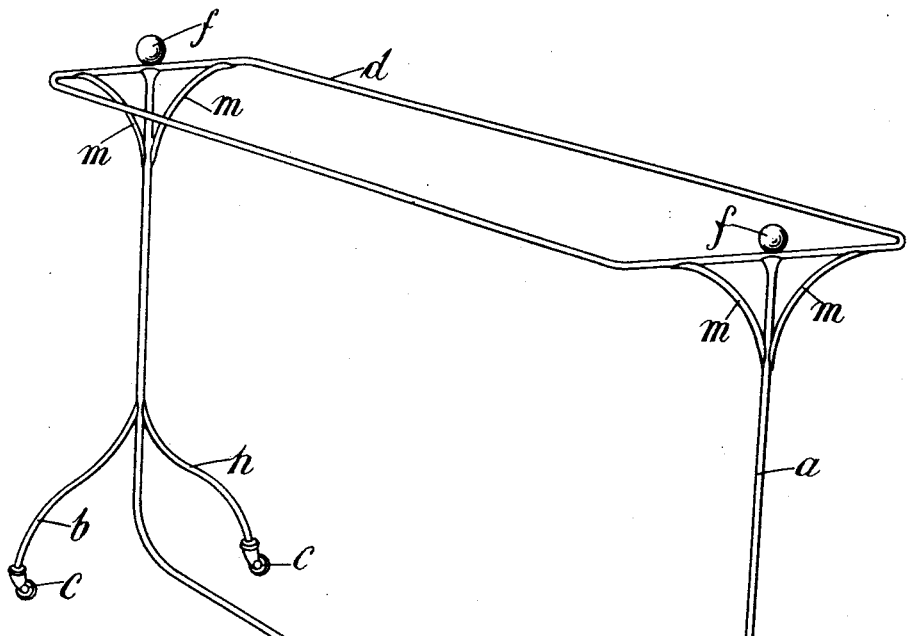
Figure 2:
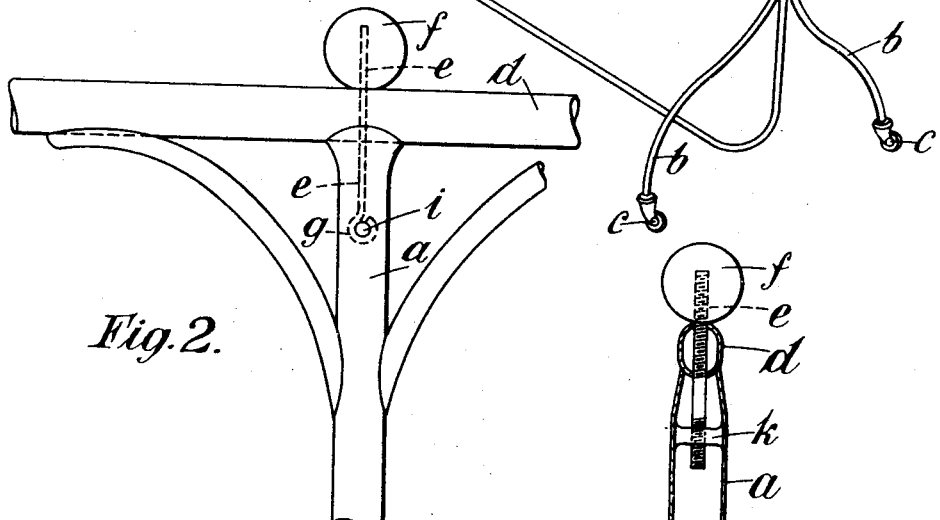
Figure 3:
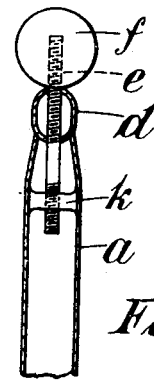

The invention is illustrated by way of example in the accompanying drawings in which Fig. 1 is a perspective view of a complete stand, and Figs. 2 and 3 are fragmentary views, on an enlarged scale showing two alternative methods of connecting the closed frame with the arms of the U-shaped member.

Referring to the drawing $a$ is a U-shaped member formed by bending a single length of metal tubing. Legs or struts $b$, also formed of bent metal tubing, are connected with the arms of the U-shaped member by welding or by any other convenient method, said legs being preferably provided with ball bearing castors $c$.

The upper ends of the arms of the U-shaped member in the case illustrated are flared and shaped to form a rest for the ends of a closed frame $d$. The frame $d$ is held in position by the engagement of apertures in its ends over screw threaded rods $e$ fixed at the ends of the arms of member $a$, and knobs $f$ which screw on to the rods $e$.

The rods $e$ may be secured within the ends of the arms of member $a$ in various ways. For example, according to the construction shown in Fig. 2 the screwed rod $e$ is furnished at its lower end with an eye $g$ which is passed into the interior of the arm $a$ and engaged around a pin $i$ passing through and fixed in the walls of the arm $a$. In the construction shown in Fig. 3, both ends of rod $e$ are screw threaded and the lower end is screwed into an aperture formed in a member $k$ which bridges the interior of the arm $a$.

In some cases where the material employed is very light, and the width of the frame $d$ is considerable, further laterally extending arms $m$ are provided projecting from the upper part of the arms $a$ and serving to form supports for the ends of the closed frame $d$ on each side of the supporting rods $e$ and thus preventing excessive strain from being imposed upon said rods $e$ and the fixing knobs $f$.

The arms $m$ are also formed of bent metal tubing, and are preferably welded to the arms $a$.

It will be observed that the horizontal part $o$ of the U-shaped support is arranged in very close proximity with the ground, that the legs $b$ are connected with the arms $a$ at a considerable height above the ground and that said legs extend outwards to a distance which provides for the the castors $c$ being situated outside the frame $d$, and thus any tendency of the display stand to overbalance when the sides of the frame member $d$ are unequally loaded is obviated.

The frame member $d$ is preferably formed of tubing of oval cross section as shown in Fig. 3 for the purpose of obtaining additional strength and rigidity.

When the stand is intended to carry very heavy loads a cross bar may be provided extending between the uprights of the U-shaped tube to avoid any possibility of the closed frame member sagging. This cross bar is preferably welded to the uprights in a position a few inches below the closed frame member.

I claim:

1. In a display stand for coats, mantles, costumes and the like, a single substantially U-shaped metal tube having its free ends uppermost, arms recessed at their upper ends extending outwardly and upwardly from each free end, said free ends being slightly flattened and recessed to receive a rectangular one-piece closed metal frame, means to detachably secure the said closed frame member thereto, and legs extending outwardly and downwardly from the upright members to a point substantially on a plane with the horizontal portion of said U-shaped member.

2. In a display stand for coats, mantles, costumes and the like, a single substantially U-shaped metal tube having its free ends uppermost, arms recessed at their upper ends extending outwardly and upwardly from each free end, said free ends being slightly flattened and recessed to receive a rectangular one-piece closed metal frame having apertures therein at the middle of its ends, rods projecting from the ends of said U-shaped member and through said apertures, knobs screwed thereon to detachably secure the said closed frame member thereto, and legs extending outwardly and downwardly from the upright members to a point substantially on a plane with the horizontal portion of said U-shaped member.

3. In a display stand of the class described, a vertical frame of substantially U-shape, the cross member of which is adapted to rest upon the floor and the upright members of which are recessed at their ends, a horizontal frame of substantially rectangular form having its end members seated in and detachably secured to the recessed upright members of said U-shaped frame, braces extending outwardly and upwardly from the upright members of said U-shaped frame and having recessed upper ends to engage and support said rectangular frame, and floor engaging legs extending outwardly and downwardly from the upright members of said U-shaped frame to the plane of the cross member to support the structure.

In testimony whereof I have signed my name to this specification.

STEPHEN PHILIP SHIPWAY.